(12) United States Patent
Feinberg et al.

(10) Patent No.: US 11,204,778 B2
(45) Date of Patent: Dec. 21, 2021

(54) EFFICIENT HIBERNATION APPARATUS AND METHOD FOR DIGITAL DEVICES

(71) Applicant: Carl Zeiss AG, Oberkochen (DE)

(72) Inventors: Eugene Feinberg, San Jose, CA (US); Ashwini Choudhary, San Jose, CA (US); Eran Steinberg, San Francisco, CA (US); Gary Gitelson, San Jose, CA (US)

(73) Assignee: Carl Zeiss AG, Oberkochen (DE)

(*) Notice: Subject to any disclaimer, the term of this patent is extended or adjusted under 35 U.S.C. 154(b) by 282 days.

(21) Appl. No.: 15/878,078

(22) Filed: Jan. 23, 2018

(65) Prior Publication Data

US 2018/0210737 A1    Jul. 26, 2018

Related U.S. Application Data

(60) Provisional application No. 62/449,557, filed on Jan. 23, 2017.

(51) Int. Cl.
| | | |
|---|---|---|
| *G06F 9/44* | (2018.01) | |
| *G06F 9/4401* | (2018.01) | |
| *G06F 1/3203* | (2019.01) | |
| *G06F 1/3246* | (2019.01) | |
| *G06F 1/3234* | (2019.01) | |
| *G06F 1/3287* | (2019.01) | |

(52) U.S. Cl.
CPC .......... *G06F 9/4418* (2013.01); *G06F 1/3203* (2013.01); *G06F 1/3243* (2013.01); *G06F 1/3246* (2013.01); *G06F 1/3275* (2013.01); *G06F 1/3287* (2013.01)

(58) Field of Classification Search
CPC .................................. G06F 9/44; G06F 9/32
See application file for complete search history.

(56) References Cited

U.S. PATENT DOCUMENTS

| | | | |
|---|---|---|---|
| 10,108,820 B2* | 10/2018 | Yang | G06F 21/78 |
| 10,268,486 B1* | 4/2019 | Mitra | G06F 1/3287 |
| 2007/0250730 A1* | 10/2007 | Reece | G06F 1/3203 |
| | | | 713/323 |
| 2010/0058007 A1* | 3/2010 | Yamauchi | G06F 1/3203 |
| | | | 711/156 |
| 2010/0058087 A1* | 3/2010 | Borras | G06F 1/3275 |
| | | | 713/322 |
| 2010/0217966 A1* | 8/2010 | Shim | G06F 9/4401 |
| | | | 713/2 |
| 2011/0185142 A1* | 7/2011 | Nishida | G06F 1/3221 |
| | | | 711/165 |

(Continued)

OTHER PUBLICATIONS

"System Sleeping States, Jul. 30, 2020, 4 pages, https://docs.microsoft.com/en-US/windows-hardware/drivers/kernel/system-sleeping-states".*

*Primary Examiner* — Phil K Nguyen
(74) *Attorney, Agent, or Firm* — Fish & Richardson P.C.

(57) ABSTRACT

Hibernating an android device includes freezing one or more tasks, processes, drives, data and/or files of open applications, or other RAM data, and creating a hibernation image. A resume image is generated based on the hibernation image. The resume image is stored to disk along with one or more hibernation parameters that are configured to guide Linux to specific memory locations of certain resume image data. Power to both the processor and the RAM storage devices of the android device are then cut off.

22 Claims, 4 Drawing Sheets

(56) References Cited

U.S. PATENT DOCUMENTS

| | | | | |
|---|---|---|---|---|
| 2012/0096256 A1* | 4/2012 | Kim | G06F 9/4418 | 713/2 |
| 2012/0297181 A1* | 11/2012 | Lee | G06F 9/4401 | 713/2 |
| 2013/0055000 A1* | 2/2013 | Lee | G06F 9/4418 | 713/323 |
| 2013/0166819 A1* | 6/2013 | Yerushalmi | G06F 3/0625 | 711/103 |
| 2013/0198435 A1* | 8/2013 | Sandadi | G06F 12/126 | 711/103 |
| 2014/0122854 A1* | 5/2014 | Kato | G06F 9/4418 | 713/1 |
| 2014/0189334 A1* | 7/2014 | Cheng | G06F 9/4418 | 713/1 |
| 2014/0253569 A1* | 9/2014 | Sakamoto | G06F 1/3203 | 345/530 |
| 2015/0186151 A1* | 7/2015 | Shen | G06F 9/4418 | 713/2 |
| 2015/0205619 A1* | 7/2015 | Kato | G06F 9/4411 | 713/2 |

\* cited by examiner

EFFICIENT HIBERNATION APPARATUS AND METHOD FOR DIGITAL DEVICES

PRIORITY AND RELATED APPLICATIONS

The application claims the benefit of priority to U.S. provisional patent application Ser. No. 62/449,557, filed Jan. 23, 2017, which is incorporated by reference.

This application is related to U.S. patent application Ser. No. 15/131,547, filed Apr. 18, 2016; and to U.S. Ser. No. 15/131,529, filed Apr. 18, 2016, published as US 2016-0309069 A1 on Oct. 20, 2016, which claims priority to U.S. Ser. No. 62/149,475, filed Apr. 17, 2015; and to U.S. Ser. No. 15/131,434, filed Apr. 18, 2016, published as US 2016-0309063 A1 on Oct. 20, 2016, which claims priority to U.S. Ser. No. 62/131,452, filed Apr. 17, 2015; and to U.S. Ser. No. 15/131,407, filed Apr. 18, 2016, published as US 2016-0309076 A1 on Oct. 20, 2016, which claims priority to U.S. Ser. No. 62/149,433, filed Apr. 17, 2015; and to U.S. Ser. No. 15/131,374 filed Apr. 18, 2016, published as US 2016-0309092 A1 on Oct. 20, 2016, which claims priority to U.S. Ser. No. 62/149,406, filed Apr. 17, 2015; and to U.S. Ser. No. 62/363,835, filed Jul. 18, 2016; and to PCT/US16/28145, filed Apr. 18, 2016, published as WO 2016/168838 on Oct. 20, 2016, which claims priority to each of U.S. Ser. No. 62/149,406, U.S. Ser. No. 62/149,433, U.S. Ser. No. 62/149,452, and U.S. Ser. No. 62/149,475. Each of these related applications is incorporated by reference.

BACKGROUND

Development of high image quality digital cameras with LTE connectivity is underway, e.g., as set forth in the related applications incorporated by reference above. In certain embodiments, these cameras exhibit key features of a high-end Android smartphone or multi-functional camera-enabled mobile communication device and/or web-connectivity accessory combined with large image sensors, large optics and/or predictable, reliable responsiveness conventionally available only with a high-end digital camera.

Some features that are key usability metrics in dedicated camera devices are not important in the mobile device use case. One key feature is boot time. Unlike smartphones which are expected to be charged nightly and/or anytime during a typical day, an Android-based high-end camera may only be used sporadically or on weekends or otherwise periodically following and/or preceding extended periods of non-use. It is desired to have an Android-based high end camera device that is capable of aggressively implementing and enduring low power or no power states, and that is configured to regain multi-application or even full functionality from those low power or no power states as quickly and reliably as possible.

While some work has been done to speed up the boot time of Android systems, there is still a gap between current dedicated camera devices and the best of Android devices, smartphones and other mobile or otherwise portable web or other network-enabled accessories. Dedicated cameras are able to capture photos within ½ second of being powered on. A typical Android device can take well over 60 seconds to become functional.

It is desired to have a boot procedure for a Qualcomm-based camera-enabled mobile device or other Android device or smartphone or other mobile processor-based digital device to reduce overall boot time and implement hibernation sleep and recovery. For example, it is further desired to have an Android device that can cold boot in less than 5 seconds and wake from hibernation in less than a second.

DETAILED DESCRIPTION OF THE EMBODIMENTS

Figure 1:
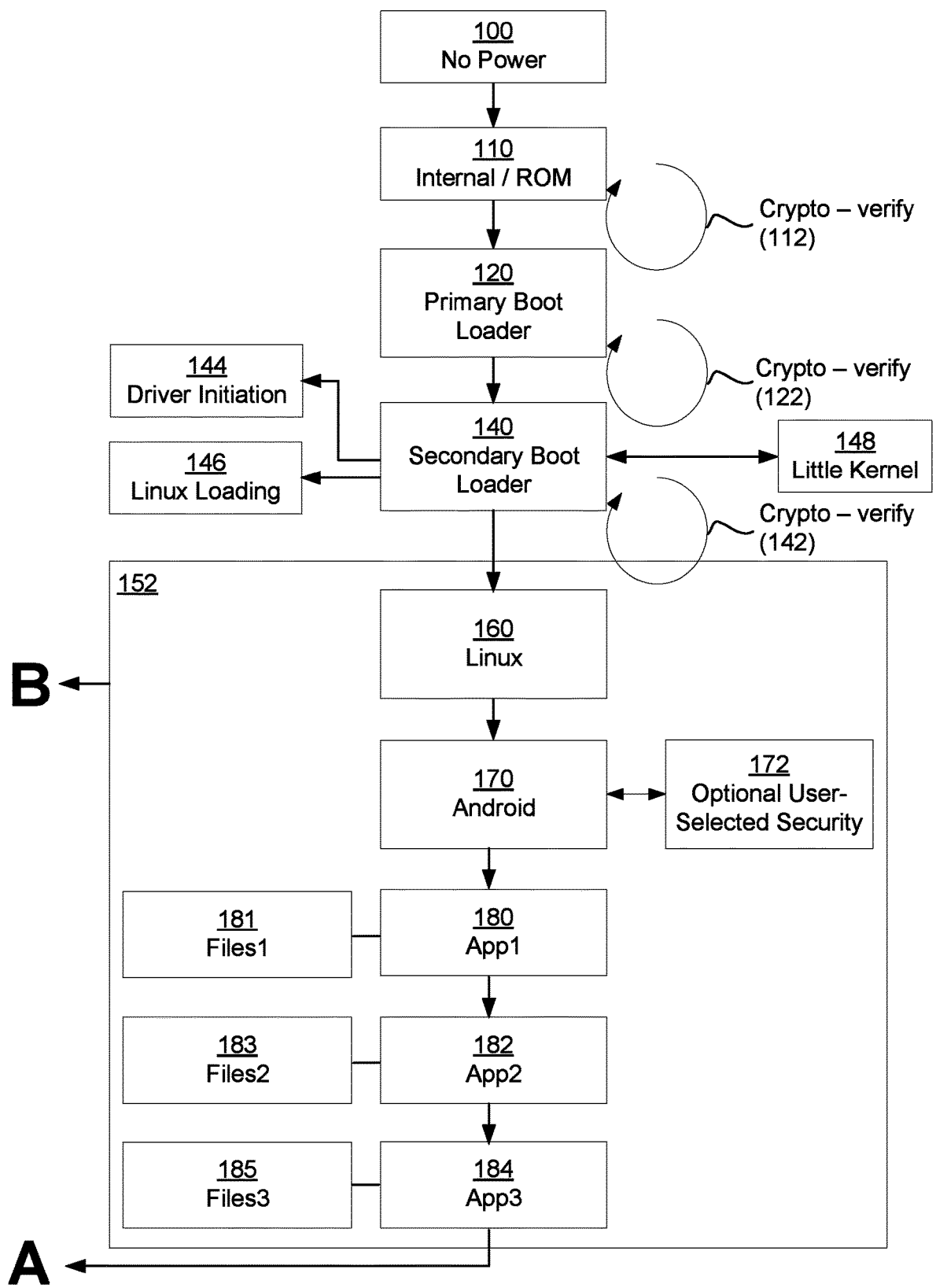
FIG. 1 illustrates steps in a power-on process in accordance with certain embodiments.

Hibernation methods, stored program code and digital devices are provided in accordance with several described embodiments with reference to the FIGS. 1-4C. In certain embodiments, a digital device may be programmed by stored program code to hibernate from a power-on state, running one or more open applications, to a power-off state cutting power to both a processor and one or more RAM digital data storage devices, in accordance with certain example embodiments of hibernation methods.

A hibernation process may be triggered in accordance with certain embodiments by a sudden or expected power loss. Examples of triggers of a hibernation process may include running out of battery power, actuating a power-off button, executing a power-off command object or receiving a hibernate command, or combinations thereof.

When the hibernation process is triggered, one or more tasks, processes or drives, or certain data or one or more files associated respectively with said one or more open applications, or other digital embodiments of bits residing in ready access memory, or combinations thereof, are frozen. A hibernation image is created that includes an image of the one or more tasks, processes, drives, data, files, and/or other RAM information that were frozen when the hibernation process was triggered. A resume image is generated based on the hibernation image. The resume image is stored to disk along with one or more hibernation parameters that are configured to guide Linux to specific memory locations of certain resume image data when the mobile device is powered-on later and expected to arrive at the resume image state. The mobile device is then hibernated to a power-off state, wherein power is cut off both to the processor and RAM storage device of the mobile device.

The one or more hibernation parameters may be associated with and/or included with certain resume image data. The one or more hibernation parameters may include short routes and/or direct routes to specific memory locations.

One or more non-transitory, processor-readable storage devices are also provided having stored thereon code for programming a processor to perform any of the hibernation processes described above or below herein and/or schematically illustrated at FIGS. 1-4C of the drawings.

A digital camera-enabled mobile device is an example of a processor-based device that is provided in accordance with several described embodiments with reference to the FIGS. 1-4C. In certain embodiments, a mobile device or other digital device may be programmed to hibernate in accordance with certain embodiments from a power-on state, running one or more open applications, to a power-off state cutting power to both its processor and its one or more RAM digital data storage devices.

Methods and stored program code are also provided herein for booting an android operating system of a digital camera-enabled mobile device or other processor-based device. In certain embodiments, an android system is programmed to cold boot in less than five seconds and to boot from hibernation is less than one second.

A method in accordance with certain embodiments includes initiating a primary bootloader upon powering-on the digital device. A modified secondary bootloader is initiated in two stages. A first set of one or more modified Linux drivers are initiated that are configured in accordance with a little Linux kernel that is configured to find and load a resume image that includes an image of a RAM digital data storage device state, including one or more open applications, that was created in a rapid shutdown process. The little Linux kernel is loaded and a resume image is found. A second set of one or more modified Linux drivers are initiated that are configured in accordance with the resume image including the image of the RAM state that was created in the rapid shutdown process. The resume image is loaded into a main Linux kernel, and the main Linux kernel is loaded for starting android and arriving at a resume image state.

The little Linux kernel may be further configured to find a set of one or more hibernation parameters that are configured to guide Linux to specific memory locations of certain resume image data. The one or more hibernation parameters may be associated with and/or included within certain resume image data. The one or more hibernation parameters may include short routes and/or direct routes to specific memory locations.

The primary bootloader may include a non-customer mutable layer. The method of booting an android operating system may include cryptographically verifying the primary and modified secondary bootloaders, including initiating one or more security features embedded within one or more processor-readable storage devices.

The resume image may include one or more tasks, processes or drives, or certain data or one or more files associated respectively with one or more open applications, or other digital embodiments of bits residing in ready access memory, or combinations thereof, that were frozen during the rapid shutdown process.

The arriving at the resume image state may include thawing the one or more tasks, processes or drives, or certain data or one or more files associated respectively with one or more open applications, or other digital embodiments of bits residing in ready access memory, or combinations thereof, that were frozen during the rapid shutdown process. The thawing may include opening and running one or more applications and opening certain files.

The loading of the resume image may include loading android, along with data for each of the open applications of the resume image state, in a single shot. Data for one or more open applications of the resume image may be configured in accordance with certain data files of the resume image state. The loading of the data for one or more open applications of the resume image may include loading one or more data files.

The loading of the resume image may include loading the open applications of the resume image state after loading android. The loading of the open applications may include fetching the open applications consecutively or at predetermined times or otherwise in separate processes as triggered by programming or at predetermined process stages.

The method of booting android may include determining that certain data are missing for one or more of the open applications in the resume image state. The missing data may be retrieved.

The loading of the resume image may include loading one or more data files of one or more open applications of the resume image state. The one or more data files may be fetched separately from the consecutively fetched open applications.

The finding of the resume image may include receiving a predetermined or otherwise automated or user-selected setting of a specific mode that corresponds to a certain resume image among multiple modes that correspond to multiple respectively available resume images. The multiple available resume images may include different resume images for different devices or computer systems on a network.

One or more non-transitory, processor-readable storage devices are also provided having stored thereon code for programming a processor to perform any of the hibernation methods or processes of booting and/or hibernating an android operating system and/or digital device, e.g., as described above or below herein and/or as schematically illustrated at FIGS. 1-4C of the drawings.

A digital camera-enabled mobile device is an example of a processor-based device that is provided in accordance with several described embodiments with reference to the FIGS. 1-4C. In certain embodiments, a mobile device or other digital device may be programmed to hibernate in accordance with certain embodiments from a power-on state, running one or more open applications, to a power-off state cutting power to both its processor and its one or more RAM digital data storage devices. A mobile device or other digital device may also be programmed to boot android and arrive at a resume image state in accordance with certain embodiments from a power-off state of both the processor and RAM devices to arrive at the resume image state with one or more open applications configured in accordance with data and/or data files captured within a resume image in accordance with certain embodiments.

FIG. 1 illustrates steps in a power-on, thaw and/or resume process performed by a processor in accordance with certain embodiments based on stored programming code. The starting point indicated in FIG. 1 is an off or no power state 100. The system contains an internal read-only memory 110 or ROM 110 typically in the form of a ROM chip 110 or multiple ROM chips 110. The ROM chip 110 includes code embedded or stored therein which is neither programmable nor erasable. This code which is embedded in the ROM chip 110 or ROM chips 110 may include a cryptographic verification security feature 112 which may be checked during an identity verification step that may be part of a process of initiating a primary bootloader 120.

Once the appropriate identity verification is performed by checking the cryptographic verification security feature 112 embedded within the ROM 110 or another local or remote storage device, the primary bootloader 120 may then be generally initiated. The primary bootloader 120 is typically not a customer mutable layer.

A secondary bootloader 140 follows the primary bootloader 120. The secondary bootloader 140 may include a customer mutable layer. The secondary bootloader 140 may be configured with a cryptographic verification security feature 142. The secondary bootloader 140 may be configured to facilitate or include driver initiation 144 and Linux loading 146. The secondary bootloader 140 may include a little kernel (LK) 148 that can bring up a logo or other typically simple graphic on a display or other user interface or UI display and/or audio output and/or vibratory or other sensory indication to the user of the device indicating that the device is coming on.

The process from no power 100 through the secondary bootloader 140 may involve the operation or running of the device for perhaps less than a second or half second. The next one, two or several seconds may involve starting a Linux kernel 160. The Android operating system may then initialized at 170 which may take up to a minute, including wait time for input from the user in accordance with an optional, user-selected cryptographic security step 172 which may involve input of a password or a biometric security feature or texted code or other security option to verify the user of the device. The initiation of the Android operating system at 170 may take significantly less than a minute and may take only a few to several seconds when the optional cryptographic security step 172 is turned off or not selected by the user, and the amount of time step 172 takes may be dependent on whether the user elects to use certain security options.

Hibernation

Hibernation is not a supported feature of many conventional devices. However, hibernation can be useful in a variety of situations including, for example, when a device running on a battery is about run out of power. In this example, a hibernation image may be captured which may involve reading out the ready access memory and storing to disk just prior to shutting down by turning off the device completely. In order to restore the ready access memory to the state just before the battery was about to run out of power, the information may be pulled from the disk during a start-up process such as that illustrated at FIG. 1. A result of running a start-up process that involves pulling the last state data which was stored to disk just before the device ran out of power is that the initial state of the device following the start-up process will be the last state of the device before it shut down due to loss of battery power or another state automatic or user-selected state that may be advantageous for a planned specific use of the device. That last state or other automatic or user-selected state may include app1 180 opened and running in a typical configuration or in a specific configuration in accordance with certain data 181 or files1 181, and/or app2 182 opened and running in accordance with certain data 183 or files2 183, and/or app3 184 opened and running in accordance with certain data 185 or files3 185.

Figure 2:
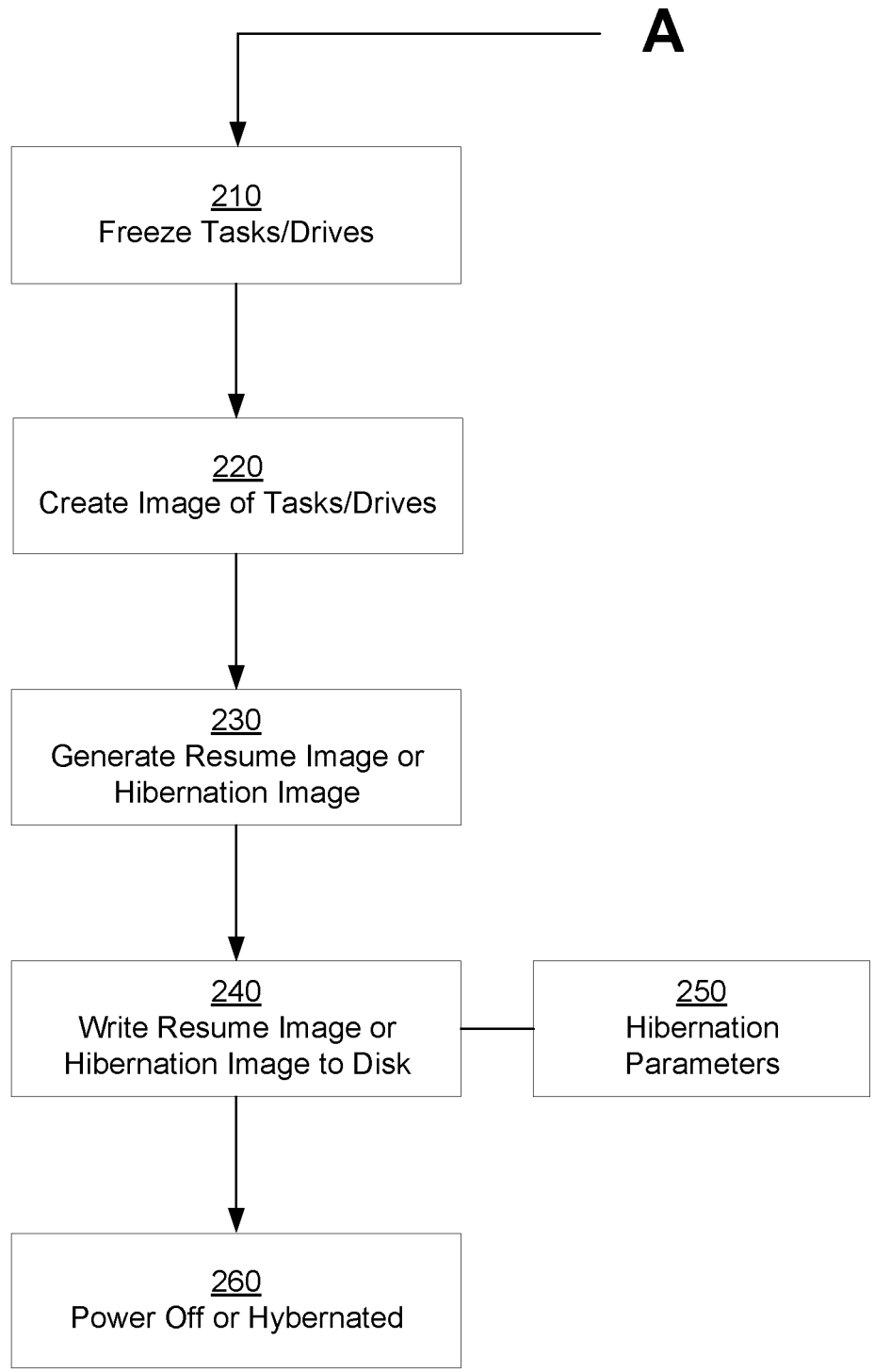
FIG. 2 illustrates a hibernation process in accordance with certain embodiments.

FIG. 2 illustrates a hibernation process in accordance with certain embodiments. A hibernation process may be triggered when a device reaches a certain critically low battery voltage level as in the above example, or in a crash/restore process, or in a rapid shutdown or user-selected shutdown process that is configured such that a next power-on will restore the state at the time of the shutdown. At that time, tasks and/or drives running on the device may be frozen 210. This freezing of the state 210 may involve all tasks, processes and drives except for the hibernation process, or selected tasks, processes and/or drives. The normal operation of the operating system on the device may be effectively suspended 210 or frozen 210 at this time. An image is created 220 of all or a subset of the data, tasks, processes and/or drives and/or other digital embodiment of bits residing in ready access memory. Certain background tasks may be killed off and not included in the created image 220 or all tasks may be included in the created image 220. A resume image or hibernation image may be generated 230 based on the created image 220 of the ready access memory. The resume or hibernation image 230 may be written to disk 240 just before the device is powered off 260 or hibernated 260. The device may be deemed to be in hibernation rather than turned off at 260, because the generated resume or hibernation image 230 will allow the device to start up and resume the last state before shut down rather than a typical start up state.

Certain hibernation parameters 250 may be included along with the resume or hibernation image 230 that includes data from ready access memory. The hibernation parameters 250 may be included with or within the resume or hibernation image 230 and/or otherwise associated or included with the data that is written to disk at 240. These hibernation parameters 250 may include short and/or direct routes to specific memory locations to guide Linux for quicker loading of the resume or hibernation image 230. These hibernation parameters 250 can be used to enhance Linux and/or Android performance during a thaw from hibernation and/or during a dynamically-selected and/or specifically-configured power-on process for a computing device.

Certain Android configurations based on a Linux kernel may have a hibernation feature which works well with Intel or Linux. However, application processors on mobile phones typically encounter opaque subsystems that make starting up a chip difficult. For example, Qualcomm has a stand alone IP block that is booted in order to boot the chip, which may have its own operating system or other software that is opaque and not visible to a programmer. In another example of a car running on Android, it may be typically not desired to simply freeze a last state for a subsequent wake up. Instead, it may be desired to start up Android from a powered off state when the car is started.

In these and other embodiments of digital systems and devices that are configured for running Android, a hibernation process may be desired that involves shutting off both the processor and the ready access memory. Such hibernation process may differ from a sleep process that suspends to ready access memory, which remains on even though the processor is turned off. Besides mobile devices and automobiles, additional example embodiments of devices, systems and/or conditions that are advantageously provided herein with a hibernation state include consumer electronic devices, drones, eyewear, goggles, security cameras, surveillance cameras, routers, embedded devices, and game devices.

Modified Secondary Bootloader

Figure 3:
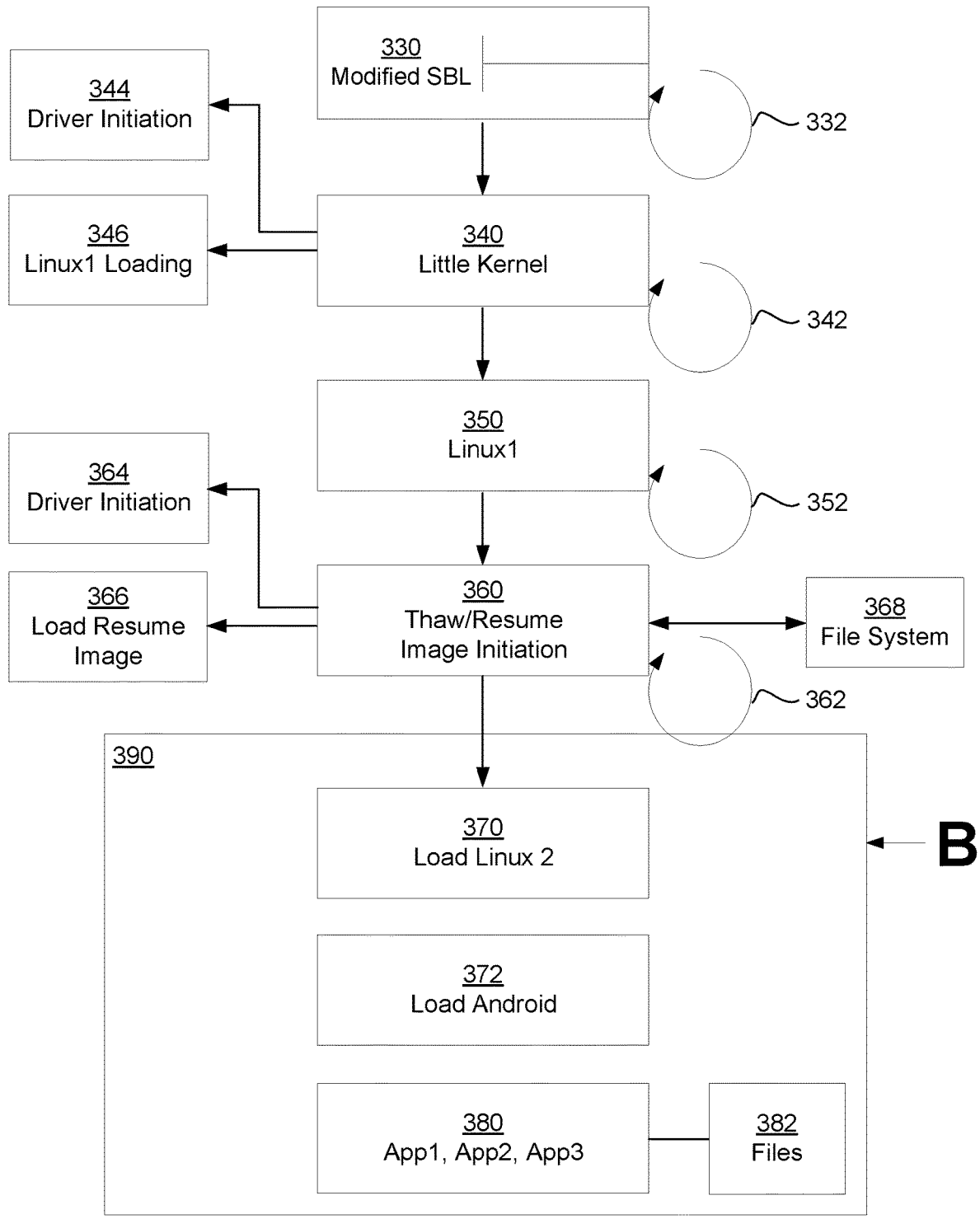
FIG. 3 illustrates a modification of a secondary bootloader in accordance with certain embodiments.

FIG. 3 illustrates a modification of a secondary bootloader 330 in accordance with certain embodiments. The secondary bootloader 140 introduced above with reference to the start-up and/or thaw procedure illustrated at FIG. 1 typically initializes drivers for fast Linux loading. A modified secondary bootloader 330 in accordance with certain embodiments may include a little kernel 340 or LK 340 that may include a crypto-security feature 342 and may initialize drivers 344 for fast Linux loading 346. The little kernel 340 or LK 340 may be configured to look for any resume or hibernation image or for a specific resume or hibernation image among multiple stored resume or hibernation images, and may load the resume or hibernation image into the Linux kernel. Advantageously, the resume or hibernation image may be loaded into and/or reside within the Linux kernel in accordance with certain embodiments.

In certain embodiments, the modified secondary bootloader 330 may facilitate a first of two Linux initialization steps. The first Linux or Linux1 initialization step 340 may be referred to as stub Linux 340 and may be embodied by a little kernel 340. Linux1 350 may be loaded at 340. Step 360 may involve crypto-security 362, driver initialization 364 and/or loading of a resume or hibernation image 366, with or without certain state data 368 or files 368. The resume or hibernation image 366 may have been identified by the modified secondary bootloader 330.

A second Linux initialization step 370 may include other typical and/or customized Linux initialization steps for loading Linux leading to starting Android 372 and arriving at the resume or hibernation image state 380, generically or in accordance with certain data files 382, for the device. Start-ups following shut down of both the processor and ready access memory of an Android device involving a modified secondary bootloader 330 and/or first and second Linux initialization steps 350, 370 that include loading the resume or hibernation image 366 into the Linux kernel may be referred to as a thaw process 390 or thawing 390 or thaw code 390 configured for performing a thaw or thawing process 390.

Just as discussed with reference to FIG. 2, certain hibernation parameters 250 may be loaded along with the data from ready access memory. The hibernation parameters may be associated with and/or included within resume or hibernation image data stored or written to disk at 240. These hibernation parameters 250 may include short and/or direct routes to specific memory locations to guide Linux for quicker loading of the resume image 366 or hibernation image 366. These hibernation parameters 250 can be used to enhance Linux and/or Android performance during a thaw 390.

A setup or settings feature on an Android device may provide multiple start-up options including one or more resume image options and/or a no resume image option. When a device is running following a start-up or a thaw, buffers and background tasks may be used in certain embodiments for efficiency. These buffers and background tasks may, however, use a great deal of memory and for this reason are not included in certain embodiments. Some of this duplication is reduced in accordance with certain embodiments. For example, during a camera start up, a preview screen may come on quickly while the camera is still booting for image capture. One may alternatively choose music to come on at start-up. However, by ordering these tasks to occur at different times during a thaw 390, a more efficient process of starting up a camera is provided in accordance with certain embodiments.

In another embodiment, management of curated hibernation images or resume images is provided so that the device can be quickly and reliably returned to the last state before shut down or hibernation occurred. Enhanced versions of resume images may be managed, deployed, downloaded or otherwise shared, particularly those that are discovered to work well for certain applications or groups of device users.

A file system is also provided in accordance with certain embodiments. The file system is based on known or dynamically discovered correlations between file system states and specific resume image states or hibernation image states. That is, a file system of a device may be optimized in accordance with a specific resume image that is selected to be used during a thaw. The correlations may be based upon user provided content, user data and/or user modified content such as music.

A snapshot of the file system at the time of creation of the hibernation image or resume image may also be included as part of what is loaded by a modified secondary bootloader, Linux level 1, and/or one or more modified drivers with or as part of a hibernation image or resume image in accordance with certain embodiments.

While conventional Qualcomm drivers are typically not amenable to hibernation, modified drivers are provided in accordance with certain embodiments that may be recreatable at resume time. That is, a set of modified drivers may be included at a modified secondary bootloader and/or Linux 1 level or loaded into Linux at a first Linux initialization step in accordance with certain embodiments. The modified set of drivers are configured in accordance with one or more specific resume images that may be selected for use during a thaw or during what a user may deem or what may appear to a user to be a start-up of the device.

A hibernation image or resume image in accordance with certain embodiments may be utilized for cold booting devices with large, mid-sized or small footprints. Use of a hibernation image or resume image in accordance with certain embodiments can serve to enhance the reliability, consistency, predictability and/or quickness of a device and/or operating system. A hibernation or resume image in accordance with certain embodiments may be user-created or user-selected, service provider-created or service provider-selected, or device-created or device-selected. A hibernation image or resume image in accordance with certain embodiments may be uploaded by or from a device, system, server or cloud-sharing platform.

A hibernation image or resume image, modified secondary bootloader, and/or modified Linux level or Linux initialization step, and/or modified driver or drivers, and/or correlated file system may be utilized to achieve a device boot-up time that is significantly less than a conventional boot-up time taking more than a minute. For example, a boot-up time may be achieved that is less than one minute, less than 30 seconds, less than 15 seconds, or even less than 8 seconds, or even less than 5 seconds, or even 3 seconds or less, or between 0.5 or 1.0 or 1.5 or 2.0 or 2.5 seconds and 3, 8, 15, 30 or 60 seconds, or between 3-8 seconds. Boot-up times for devices having certain amounts of DRAM may be reduced in accordance with certain embodiments from conventional boot-up times for devices with similar amounts of DRAM that are not configured in accordance with certain embodiments.

Memory Management

Figure 4A:
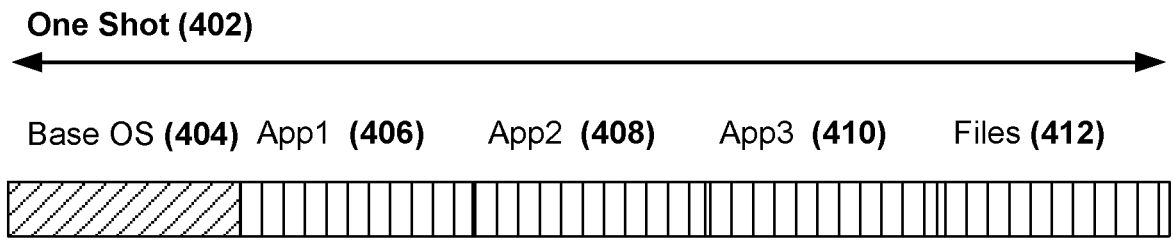
FIGS. 4A-4C illustrate memory management processes in accordance with certain embodiments.
Figure 4B:
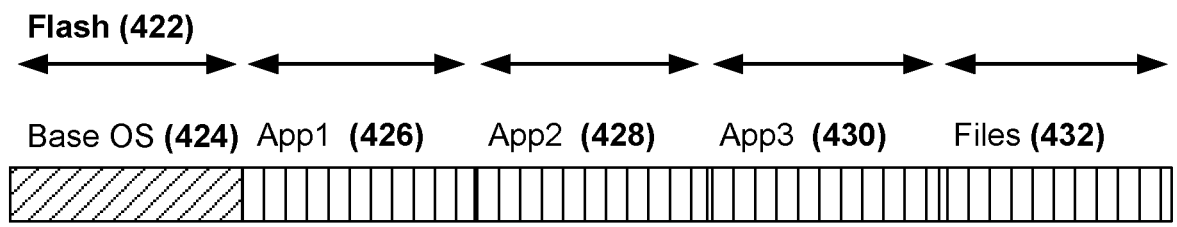
Figure 4C:

FIGS. 4A-4C illustrate memory management processes or architectures of stored code in accordance with certain embodiments. A device may be programmed for one-shot loading 402, or alternatively for flash loading 422 (see Ubiquitous.com), or for demand loading 442 in alternative embodiments. In one-shot loading, base operating system data is loaded 404 along with the data for each application 406, 408, 410 that is in this example part of the hibernation image or resume image. Such application data 406, 408, 410 may be configured generically or in accordance with certain data files 412 such as those corresponding to the system state at last shutdown.

In flash loading 422, the base operating system data 424 may be loaded as one block, while applications 426, 428, and 430, and data files 432, are fetched consecutively at predetermined times or otherwise in separate processes as triggered by programming or at predetermined process stages. For each region of memory 424, 426, 428, 430, 432 that is to be loaded, when it is determined that certain data is missing from the region, then the missing data may be retrieved from disc or elsewhere. Page fault and/or fault handling may be provided that may be specifically configured to determine where the missing data is and to retrieve the missing data from the determined locations. Some or all of certain region data may be compressed.

In demand loading 442, the base operating system data 444 may be loaded as one block. Any application or other data may be fetched in separate routines subsequently as needed or at predetermined times or as triggered by programming or at predetermined process stages. For each region of memory that is to be loaded, when it is determined that certain data is missing from the region, then the missing data may be retrieved from disc or elsewhere. Page fault and/or fault handling may be provided and may be specifically configured to determine where the missing data is and to retrieve the missing data from the determined locations. Some or all of certain region data may be compressed.

Multiple modes may be provided in certain embodiments that correspond to multiple available hibernation or resume images. Each mode may correspond to a different hibernation or resume image. Different hibernation or resume images may be provided for different devices or computer systems on a network.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the term "process" or "code" or "data" or "files" does not imply that the components or functionality described or claimed as part of the process, code, data and/or files are all configured in a common package. Indeed, any or all of the various components of a process or programming architecture or embedded code or data or files may be combined in a single package or separately maintained and may further be manufactured, assembled or distributed at or through multiple locations and/or may be stored at and/or fetched from a single location or from multiple locations.

The various embodiments set forth herein are described in terms of exemplary schematic diagrams and other illustrations. As will be apparent to one of ordinary skill in the art after reading this document, the illustrated embodiments and their various alternatives may be implemented without confinement to the illustrated examples. For example, schematic diagrams and their accompanying description should not be construed as mandating a particular architecture or configuration.

What is claimed is:

1. A method of hibernating a digital camera-enabled device that includes a processor and at least one data storage device from a power-on state running one or more open applications to a reduced-power state, the method comprising:
    triggering a hibernation process to freeze one or more applications, processes, data storage devices, or one or more files, or combinations thereof;
    creating a hibernation image of said one or more applications, processes, data storage devices, or one or more files, or said combinations thereof;
    generating a resume image based on the hibernation image;
    determining a specific memory location within the resume image corresponding to a particular application;
    generating one or more hibernation parameters that are configured to guide an operating system to the specific memory location;
    storing the resume image to the at least one data storage device along with the one or more hibernation parameters such that the particular application is locatable within the resume image with the stored hibernation parameters to be given higher thawing priority; and
    hibernating the digital camera-enabled device to a reduced-power state including reducing power to the at least one data storage device;
    providing, during startup of the digital camera-enabled device, interface elements allowing a user to provide input; and
    receiving, through the interface elements, user input that causes the specific application to be identified out of a plurality of possible applications.

2. The method of claim 1, wherein the one or more hibernation parameters are associated with said certain resume image data.

3. The method of claim 1, wherein the one or more hibernation parameters are included within said certain resume image data.

4. The method of claim 1, wherein the one or more hibernation parameters include short routes to the specific memory location.

5. The method of claim 1, wherein the one or more hibernation parameters include direct routes to routes to the specific memory location.

6. The method of claim 1, wherein said triggering said hibernation process comprises running out of battery power, actuating a power-off button, executing a power-off command object or receiving a hibernate command, or combinations thereof.

7. One or more non-transitory, processor-readable storage devices having stored thereon code for causing a processor to perform a method of hibernating a digital camera-enabled device that includes a processor and at least one data storage device from a power-on state running one or more open applications to a reduced-power state, wherein the method comprises:

triggering a hibernation process to freeze one or more applications, processes, data storage devices, or one or more files, or combinations thereof;

creating a hibernation image of said one or more applications, processes, data storage devices, or one or more files, or said combinations thereof;

generating a resume image based on the hibernation image; determining a specific memory location within the resume image corresponding to a particular application;

generating one or more hibernation parameters that are configured to guide an operating system to the specific memory location;

storing the resume image to the at least one data storage device along with the one or more hibernation parameters such that the particular application is locatable within the resume image with the stored hibernation parameters to be given higher thawing priority; and hibernating the digital camera-enabled device to a reduced-power state including reducing power to the at least one data storage device;

providing, during startup of the digital camera-enabled device, interface elements allowing a user to provide input; and receiving, through the interface elements, user input that causes the specific application to be identified out of a plurality of possible applications.

8. The one or more storage devices of claim 7, wherein the one or more hibernation parameters are associated with said certain resume image data.

9. The one or more storage devices of claim 7, wherein the one or more hibernation parameters are included within said certain resume image data.

10. The one or more storage devices of claim 7, wherein the one or more hibernation parameters include short routes to the specific memory location.

11. The one or more storage devices of claim 7, wherein the one or more hibernation parameters include direct routes to the specific memory location.

12. The one or more storage devices of claim 7, wherein said triggering said hibernation process comprises running out of battery power, actuating a power-off button, executing a power-off command object or receiving a hibernate command, or combinations thereof.

13. A digital camera-enabled device, comprising:
a device housing;
a battery;
a display,
a camera,
a processor, and
triggering a hibernation process to freeze one or more applications, processes, data storage devices, or one or more files, or combinations thereof;
creating a hibernation image of said one or more applications, processes, data storage devices, or one or more files, or said combinations thereof;
generating a resume image based on the hibernation image;
determining a specific memory location within the resume image corresponding to a particular application;
generating one or more hibernation parameters that are configured to guide an operating system to the specific memory location;
storing the resume image to the at least one data storage device along with the one or more hibernation parameters such that particular application is locatable within the resume image with the stored hibernation parameters to be given higher thawing priority; and
hibernating the digital camera-enabled device to a reduced-power state including reducing power to the at least one data storage device
providing, during startup of the digital camera-enabled device, interface elements allowing a user to provide input; and
receiving, through the interface elements, user input that causes the specific application to be identified out of a plurality of possible applications.

14. The device of claim 13, wherein the one or more hibernation parameters are associated with said certain resume image data.

15. The device of claim 13, wherein the one or more hibernation parameters are included within said certain resume image data.

16. The device of claim 13, wherein the one or more hibernation parameters include short routes to the specific memory location.

17. The device of claim 13, wherein the one or more hibernation parameters include direct routes to the specific memory location.

18. The device of claim 13, wherein said triggering said hibernation process comprises running out of battery power, actuating a power-off button, executing a power-off command object or receiving a hibernate command, or combinations thereof.

19. A method of hibernating a digital camera-enabled device having an operating system that controls processes being executed by a processor, the method comprising:
triggering a hibernation process to freeze one or more processes running on the digital camera-enabled device, the one or more processes including an image capture process;
creating a hibernation image of the one or more process;
generating a resume image based on the hibernation image;
determining a specific memory location within the resume image corresponding to a particular application;
generating one or more hibernation parameters that are configured to guide an operating system to the specific memory location;
storing the resume image to the at least one data storage device along with the one or more hibernation parameters such that the particular application is locatable within the resume image with the stored hibernation parameters to be given higher thawing priority; and
hibernating the digital camera-enabled device to a reduced-power state including reducing power to the processor;
providing, during startup of the digital camera-enabled device, interface elements allowing a user to provide input; and
receiving, through the interface elements, user input that causes the specific application to be identified out of a plurality of possible applications.

20. The method of claim 19 wherein the higher priority of the image capture process causes the processor to thaw the image capture process before frozen processes having lower priorities.

21. A digital camera-enabled device having an operating system that controls processes being executed by a processor, the processor performing a method comprising:

triggering a hibernation process to freeze one or more processes running on the digital camera-enabled device, the one or more processes including an image capture process;

creating a hibernation image of the one or more process;

generating a resume image based on the hibernation image;

determining a specific memory location within the resume image corresponding to a particular application;

generating one or more hibernation parameters that are configured to guide an operating system to the specific memory location;

storing the resume image to the at least one data storage device along with the one or more hibernation parameters such that the particular application is locatable within the resume image with the stored hibernation parameters to be given higher thawing priority; and hibernating the digital camera-enabled device to a reduced-power state including reducing power to the processor;

providing, during startup of the digital camera-enabled device, interface elements allowing a user to provide input; and receiving, through the interface elements, user input that causes the specific application to be identified out of a plurality of possible applications.

22. The digital camera-enabled device of claim 21 wherein the higher priority of the image capture process causes the processor to thaw the image capture process before frozen processes having lower priorities.

* * * * *